(12) United States Patent
Gayon

(10) Patent No.: US 10,899,258 B2
(45) Date of Patent: Jan. 26, 2021

(54) ARMREST FOR VEHICLE SEAT AND VEHICLE SEAT COMPRISING SUCH AN ARMREST

(71) Applicant: Faurecia Sièges d'Automobile, Nanterre (FR)

(72) Inventor: David Gayon, Etrechy (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 0 days.

(21) Appl. No.: 16/299,716

(22) Filed: Mar. 12, 2019

(65) Prior Publication Data

US 2019/0275919 A1 Sep. 12, 2019

(30) Foreign Application Priority Data

Mar. 12, 2018 (FR) ...................... 18 52130

(51) Int. Cl.
*B60N 2/70* (2006.01)
*B60N 2/75* (2018.01)
(Continued)

(52) U.S. Cl.
CPC .............. *B60N 2/797* (2018.02); *B60N 2/76* (2018.02); *B60N 2/79* (2018.02); *B60R 11/0235* (2013.01);
(Continued)

(58) Field of Classification Search
CPC . B60N 2/797; B60N 2/75; B60N 2/79; B64D 11/00155; B64D 11/0235;
(Continued)

(56) References Cited

U.S. PATENT DOCUMENTS

| 5,374,104 A | * | 12/1994 | Moore | ...................... A47C 7/72 |
| | | | | 297/188.16 |
| 5,547,248 A | * | 8/1996 | Marechal | ................. B60N 2/79 |
| | | | | 297/188.17 |

(Continued)

FOREIGN PATENT DOCUMENTS

| DE | 3719105 A1 | 12/1988 |
| EP | 1431107 A2 | 6/2004 |

(Continued)

OTHER PUBLICATIONS

French Search Report corresponding to application No. FR 1852130, dated Nov. 21, 2018, 8 pages.

*Primary Examiner* — Mark R Wendell
(74) *Attorney, Agent, or Firm* — Reising Ethington P.C.

(57) ABSTRACT

An armrest includes an armrest arm having an upper support surface forming a support for the forearm of an occupant of the vehicle seat, and a user interface having at least one display portion of flattened shape, having a front face comprising a screen and a rear face formed by a shell. The user interface is mounted on the armrest arm so as to be movable between a retracted position where the screen is inaccessible and an extended position where the screen is accessible. In the retracted position of the user interface, the shell is integrated with the upper support surface of the armrest arm, and in the extended position of the user interface, the screen is at least partially projecting above the upper support surface of the armrest arm.

17 Claims, 3 Drawing Sheets

(51) Int. Cl.
  *B60R 11/02* (2006.01)
  *B64D 11/00* (2006.01)
  *B60R 11/00* (2006.01)

(52) U.S. Cl.
  CPC .... *B60R 11/0264* (2013.01); *B64D 11/00155* (2014.12); *B60R 2011/0014* (2013.01); *B60R 2011/0082* (2013.01); *B60R 2011/0084* (2013.01)

(58) Field of Classification Search
  CPC ........ B64D 11/0264; B60R 2011/0014; B60R 2011/0082; B60R 2011/0084
  USPC ...................................................... 297/217.3
  See application file for complete search history.

(56) References Cited

U.S. PATENT DOCUMENTS

| | | | | |
|---|---|---|---|---|
| 5,984,415 A | * | 11/1999 | Schumacher | B64D 11/0646 297/411.2 |
| 6,663,155 B1 | * | 12/2003 | Malone | B60R 11/0229 224/539 |
| 6,705,675 B1 | * | 3/2004 | Eastman | B60N 2/2806 297/250.1 |
| 6,746,065 B1 | | 6/2004 | Chan | |
| 2003/0151282 A1 | * | 8/2003 | Williams | B60N 2/818 297/250.1 |
| 2004/0217615 A1 | | 11/2004 | Lindstrom et al. | |
| 2005/0082858 A1 | | 4/2005 | Neumann | |
| 2005/0231008 A1 | | 10/2005 | Jaaska, Sr. | |
| 2006/0258441 A1 | * | 11/2006 | Vitito | B60R 11/02 463/29 |
| 2012/0061999 A1 | * | 3/2012 | Soriano | A47D 1/0081 297/174 R |
| 2012/0200129 A1 | * | 8/2012 | Wilson, Jr. | A47C 7/72 297/217.3 |
| 2017/0021928 A1 | * | 1/2017 | Satterfield | B64D 11/0627 |
| 2018/0304789 A1 | * | 10/2018 | Robert | B60N 2/77 |
| 2019/0184877 A1 | * | 6/2019 | Gomez | B60N 2/797 |

FOREIGN PATENT DOCUMENTS

| | | |
|---|---|---|
| FR | 2842483 A1 | 1/2004 |
| WO | WO03051665 A1 | 6/2003 |

\* cited by examiner

ARMREST FOR VEHICLE SEAT AND VEHICLE SEAT COMPRISING SUCH AN ARMREST

TECHNICAL FIELD

The present description relates to an armrest for a seat of a vehicle, in particular a motor vehicle, and a vehicle seat provided with such an armrest.

More particularly, the description relates to an armrest for a vehicle seat, comprising:
- an armrest arm having an upper support surface forming a support for the forearm of an occupant of the vehicle seat, and
- a user interface having at least one display portion, having a front face comprising a screen and a rear face, the user interface being mounted on the armrest arm so as to be movable between a retracted position where the screen is inaccessible and an extended position where the screen is accessible.

BACKGROUND

Patent US 2005231008A1 discloses an armrest of this type, which has the disadvantage that in the extended position, the armrest is virtually unusable as a support for the user's forearm.

SUMMARY

The present description is intended to overcome this disadvantage.

For this purpose, in an armrest of the aforementioned type, it is provided that the rear face of the display portion forms a shell and in the retracted position, the shell is integrated with the upper support surface of the armrest arm and forms a support region for at least part of the forearm of the occupant of the vehicle seat, and in the extended position of the user interface, the screen is at least partially projecting above the upper support surface of the armrest arm.

The comfort of the occupant is thus increased when the user interface is in the extended position.

In various embodiments of the armrest, one or more of the following may also be in effect:
- the user interface at least partially forms a free end of the armrest;
- the user interface is rotatable relative to the armrest arm;
- the user interface is mounted on a support which is itself mounted to be movable in translation relative to the armrest arm, in a longitudinal direction of the armrest arm;
- said support is arranged at a free end of the armrest;
- said support comprises two support arms extending in the longitudinal direction of the support arm and arranged one on either side of the user interface;
- the upper support surface of the armrest arm has a covering and the shell has the same covering;
- the user interface is mounted to be pivotable about an axis of rotation and further comprises a control portion integral with the display portion, the control portion having a front face and a rear face, the front face having an input interface and being arranged to be inaccessible when the user interface is in the retracted position, the armrest arm having a through-opening which accommodates the screen portion in the retracted position and the control portion in the extended position;
- the axis of rotation is arranged at the junction between the screen portion and the control portion;
- the front face of the screen portion forms an angle of between 95 and 140 degrees with the front face of the control portion;
- the rear face of the control portion at least partially forms a free end of the armrest when the user interface is in the retracted position;
- the user interface can be positioned in an indexed intermediate position where the screen is visible to an occupant of the vehicle seat but where the control portion is arranged obliquely in the through-opening of the armrest arm, so that the input interface is effectively unusable;
- the user interface can be positioned in an indexed partially-open position where the screen is not visible to an occupant of the vehicle seat and where the control portion is arranged obliquely in the through-opening of the armrest arm;
- the input interface is a touch surface;
- the rear face of the screen portion is aligned with the upper support face of the armrest arm when the user interface is in the retracted position:
- the shell is integral with the screen;
- the armrest arm has an opening which accommodates the display portion in the retracted position.

The present description also relates to a vehicle seat comprising a seating portion, a backrest, and at least one armrest as defined above. Optionally, the armrest arm is distanced from the backrest by at least 10 cm in the longitudinal direction of the armrest arm. Optionally, the armrest is height-adjustable relative to the seating portion.

BRIEF DESCRIPTION OF DRAWINGS

Other features and advantages will be apparent from the following description of two embodiments, given as non-limiting examples, with reference to the accompanying drawings.

In the drawings.

DETAILED DESCRIPTION

Figure 1A:
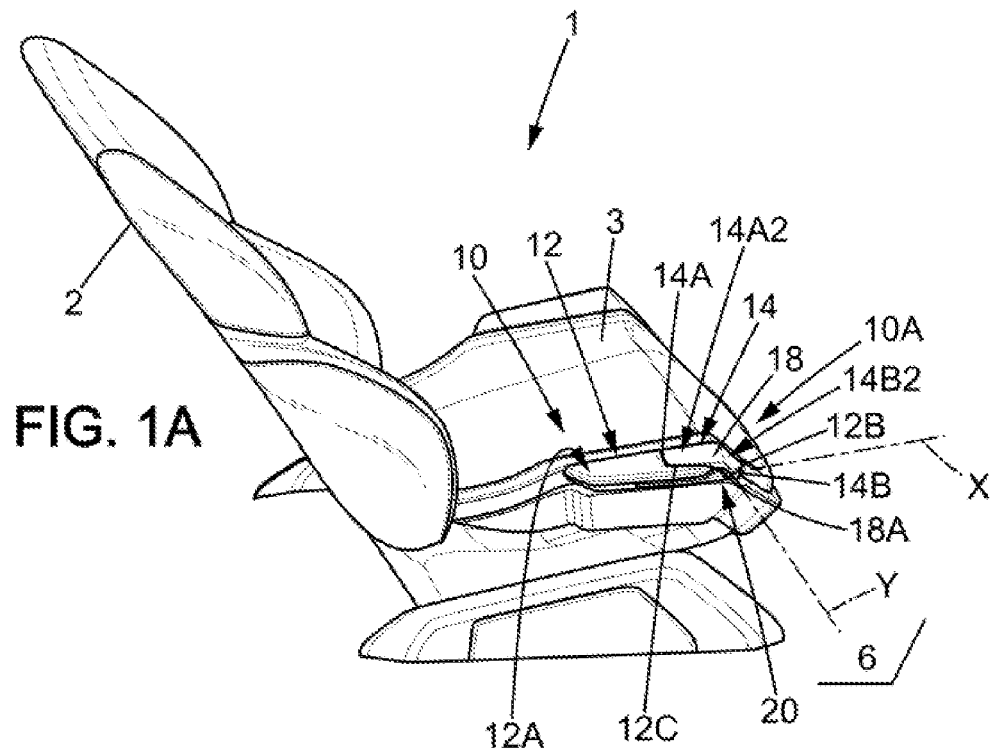
FIG. 1A is a perspective side view of an example of a vehicle seat, provided with an armrest with a user interface in the retracted position, the armrest being in the lowered position.

FIG. 1 illustrates a vehicle seat 1, in particular a motor vehicle seat. The seat 1 comprises a backrest 2 and a seating portion 3. The seating portion 3 is mounted on the floor 6 of the motor vehicle, for example by means of rails (not shown).

In addition, the seat 1 is provided with an armrest 10.

Such an armrest 10 essentially comprises an armrest arm 12 forming a support for the forearm of an occupant (not shown) of the vehicle seat. More particularly, the armrest arm 12 has an upper support surface 12A forming a support for the forearm of an occupant of the vehicle seat 1. The armrest 10 may optionally be mounted on the seating portion 3 and height-adjustable relative to the seating portion 3, between a lowered position illustrated in FIG. 1A and a raised position illustrated in FIG. 1B. The armrest may also be fixed relative to the seating portion 3; in particular, the armrest may not be height-adjustable.

The armrest may be arranged at a distance and frontwards from the backrest 2, for example at a distance D of at least 10 cm frontwards from the frontmost part of the backrest 2.

As shown in all the figures, the armrest 10 comprises a user interface 14 having at least one display portion 14A preferably of flattened shape, having a front face 14A1 comprising at least one screen 16 and a rear face 14A2 formed by a shell 18 which may be rigid (made for example of plastic) or flexible (made for example of leather, cloth, or other). The screen 16 may be of any known type, in particular any type commonly used for the screens of mobile phones and tablets ("smartphones" and "smart pads"). The shell 18 is integral to the screen 16 and together with it forms a closed housing.

The screen 16 may be a touchscreen and thus serve not only as the display, but also as an input interface for controlling the user interface and/or functions of the seat and/or functions of the vehicle. In this case, the user interface 14 may possibly be limited to the display portion 14A.

The user interface 14 may further comprise a control portion 14B separate from the display portion 14A, the control portion 14B preferably being of flattened shape and having a front face 14B1 comprising an input interface 17 and a rear face 14B2 opposite to the front face. The front face 14B1 of the control portion 14B is on the same side of the user interface 14 as the front face 14A1 of the display portion 14A, and the rear face 14B2 of the control portion 14B is on the same side of the user interface 14 as the rear face 14A2 of the display portion 14A. The rear face 14B2 of the control portion 14B may be formed for example by a shell identical or similar to the shell 18 of the rear face 14A2 of the display portion 14A. The shell forming the rear face 14B2 is integral with the front face 14B1 and together with it forms a closed housing.

The control portion 14B may preferably be integral with the display portion 14A, in other words with no possibility of relative movement between these two portions. Alternatively, the control portion 14B and the screen portion 14A could be interconnected by a pivot connection allowing relative rotation between these two portions, over a limited angle.

The front face 14B1 of the control portion 14B may form an angle β of less than 180° with the front face 14A1 of the display portion 14A. The angle β may be for example between 95 and 140 degrees, in particular about 110 degrees.

The input interface 17 may be of any known type. The input interface 17 may for example be formed by a keyboard and/or a touchpad. The input interface 17 may be fully tactile. For example, the input interface may be a touchscreen of any known type, in particular any type commonly used for the screens of mobile phones and tablets ("smartphones" and "smart pads"), if necessary of lower definition than the aforementioned screen 16.

The user interface 14 is mounted on the armrest arm 12 so as to be movable between a retracted position (FIGS. 1A-1B) in which the screen 16 is inaccessible (as is the input interface 17 when such an interface input is provided) and an extended position (FIGS. 1E-2) in which the screen 16 is accessible and visible to a user sitting on the seat 1 (as is the input interface 17 when such an input interface is provided).

In the retracted position of the user interface 14 (FIGS. 1A-1B), the shell 18 is integrated with the upper support surface 12A of the armrest arm 12 and forms a support region for at least part of the forearm of the occupant of the vehicle seat. More particularly, in the retracted position, the shell 18 is aligned with the upper support surface 12A and serves as a support for the forearm on part of the upper surface of the armrest 12, while the upper support surface 12A serves as a support for the forearm on the rest of the upper surface of the armrest 12. Advantageously, the rear face 14A2 of the screen portion is then aligned with the upper support surface, in other words generally in the same plane. The shell 18 may have the same covering as the upper support surface 12A of the armrest arm 12. In the retracted position of the user interface 14, the rear face 14B2 of the control portion 14B may form a free end 10A of the armrest 10 (the end furthest from the backrest 2). This rear face 14B2 of the control portion 14B may have the same covering as the shell 18 and the upper support surface 12A of the armrest arm 12.

The user interface 14 may be mounted so as to pivot about a transverse axis of rotation Y that is horizontal and perpendicular to the longitudinal direction X of the armrest.

The axis of rotation Y may be arranged at the junction between the screen portion 14A and the control portion 14B.

The armrest arm 12 has an opening 12C formed in the upper support surface 12A. The opening 12C accommodates the screen portion 14A in the retracted position and the user interface 14 can pivot within this opening 12C. The opening 12C may be a vertical through-opening.

Figure 1B:
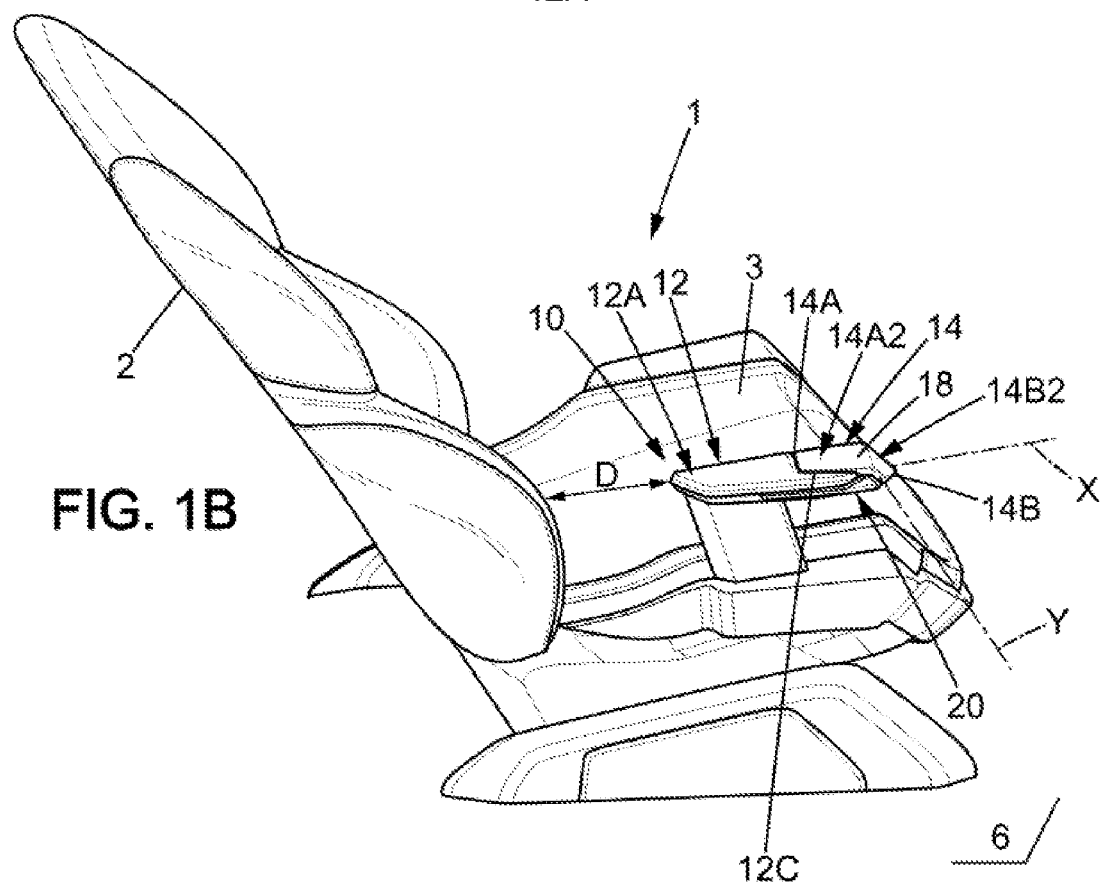
FIG. 1B is a view similar to FIG. 1A, with the armrest in the raised position.
Figure 1C:
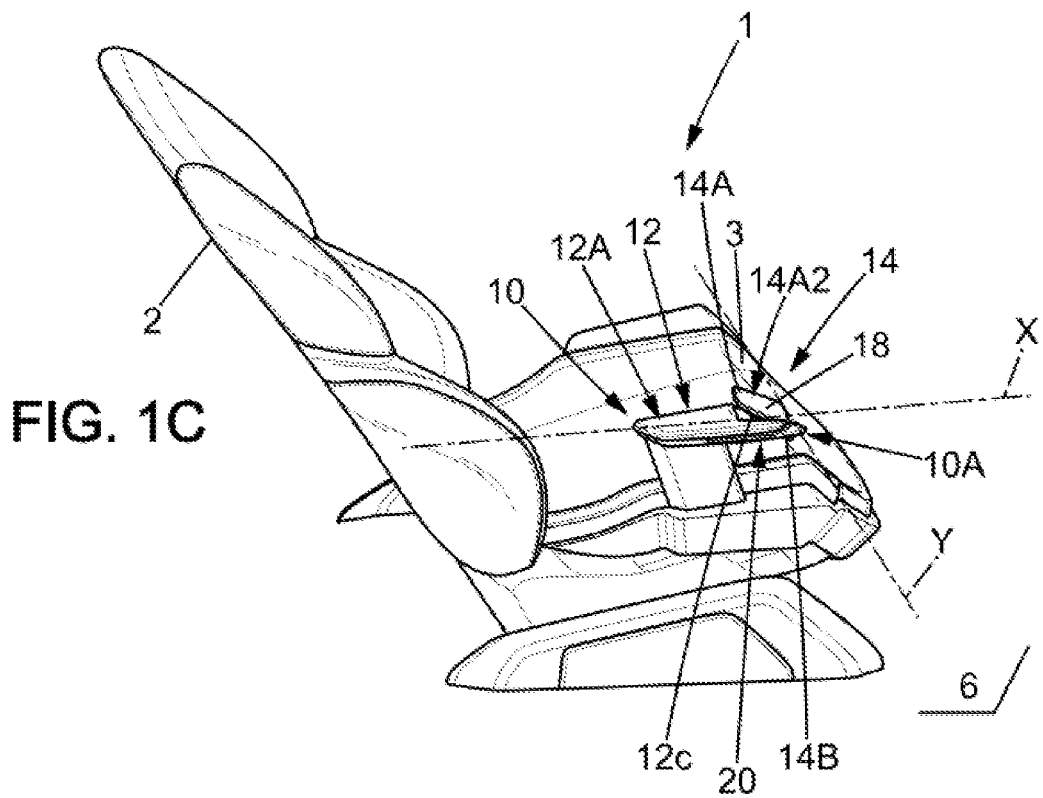
FIG. 1C is a view similar to FIG. 1A, with the user interface pivoting towards the extended position.
Figure 1D:
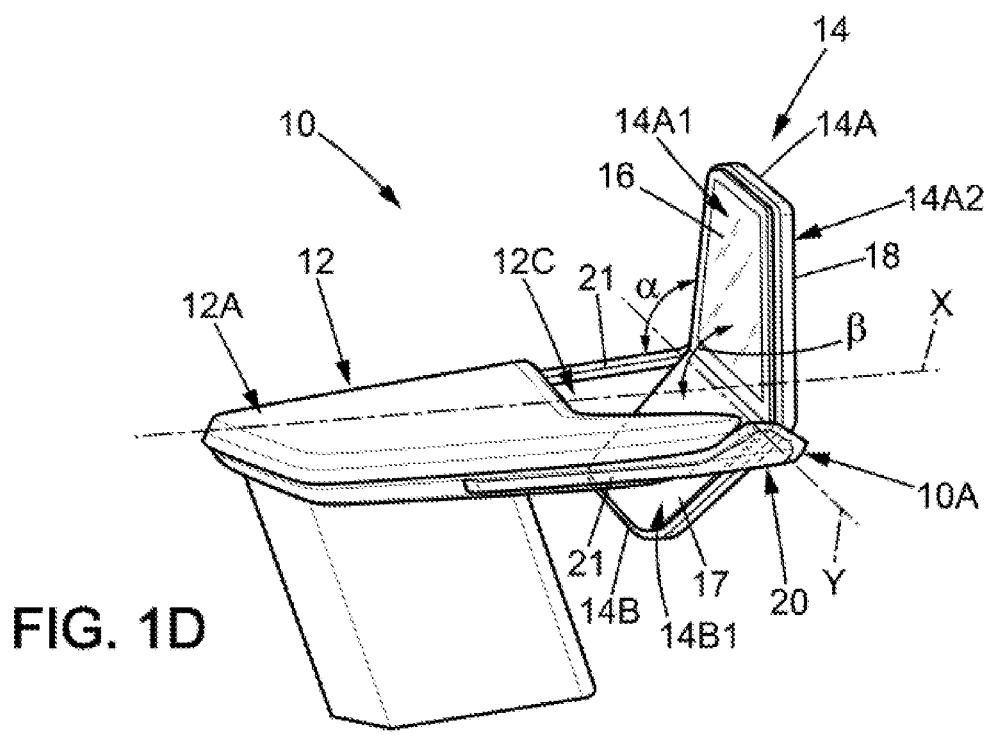
FIG. 1D is an enlarged view of the armrest, with the user interface in an intermediate position of use.
Figure 2:
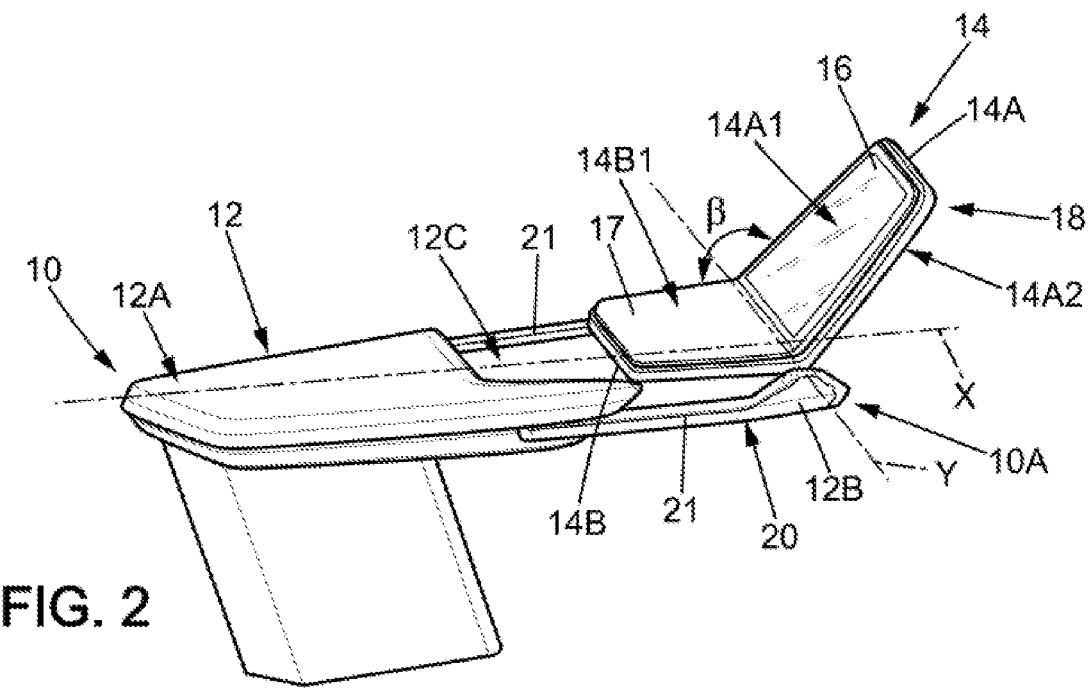
FIG. 2 is an enlarged view of the armrest, with the user interface in the extended position and slid forward.

As can clearly be seen in FIGS. 1D and 2, the user interface 14 can be mounted so as to pivot on a support 20 which is arranged at the free end 10A of the armrest and which is itself mounted to be movable in translation relative to the armrest arm 12, in the longitudinal direction X of the armrest arm 12. The support 20 may comprise two support arms 21 extending in the longitudinal direction X and arranged one on either side of the user interface 14 and one on either side of the abovementioned through-opening 12C.

From the retracted position in FIGS. 1A-1B (which may be a stop position for the rotation of the user interface 14), the user interface 14 can be rotated about the axis of rotation Y so as to raise the screen portion 14A and cause it to exit the through-opening 12C. It is thus possible to rotate the user interface 14 into an indexed partially-open position, shown in FIG. 1C, where the screen 16 is not visible or is insufficiently visible for use. In this partially-open position, the screen 16 may form an acute angle with the upper support face 12A, for example an angle between 5 and 70 degrees. This position may be useful for improving comfort for the seat's occupant, with the shell 18 still serving as a support for part of the occupant's forearm.

Between the retracted position and the extended position, the user interface may optionally have an intermediate indexed position, visible in FIG. 1D, where the screen 16 is visible to an occupant seated on the vehicle seat 1 but where the control portion 14B is arranged obliquely downward in the through-opening 12C of the armrest arm 12, so that the input interface 17 is unusable for all practical purposes. This intermediate position may be for example such that the front face 14A1 of the display portion 14A forms an angle α with the longitudinal axis X that is less than the aforementioned angle β. For example, angle α may be between 80 and 110 degrees, in particular about 90 degrees. One will note that in this intermediate position, the input interface 17 could possibly also be electronically deactivated.

Figure 1E:
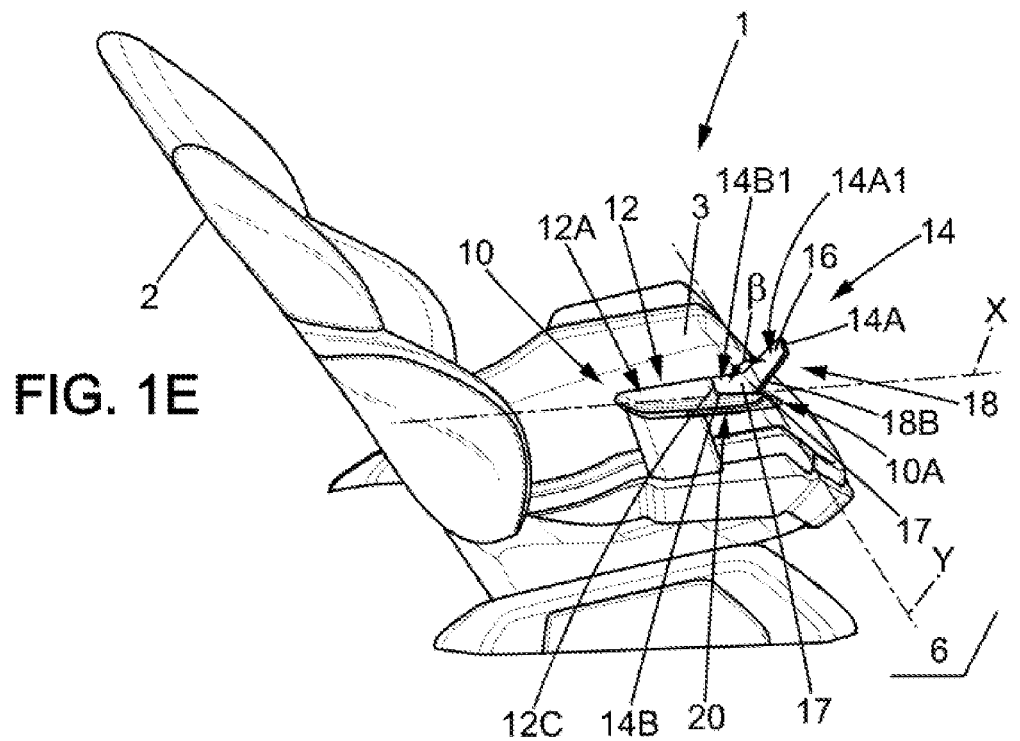
FIG. 1E is a view similar to FIG. 1A, with the user interface in the extended position.

In the extended position of the user interface 14, visible in FIGS. 1E and 2, the screen 16 is at least partially projecting above the upper support surface 12A of the armrest arm 12. More particularly, the input interface 17 is parallel to the upper support face 12A of the armrest arm, and the screen 16 thus forms an angle, equal to β, with this upper support surface 12A. As shown in FIG. 2, the occupant of the seat can slide the support in the longitudinal direction X to optimize comfort when using the input interface 14.

The user interface 14 may be adapted for controlling the vehicle seat 1 and/or other parts of the vehicle, as well as enabling:

- the adjustment of the longitudinal position and/or the height of the seat 1,
- the adjustment of the tilt of the backrest 2;
- the adjustment of the height of the armrest 10;
- the adjustment of any other parameter in the motor vehicle, such as adjustment of the audio (car radio), the GPS, the position of the side mirrors, of the rear view mirror, the position of the steering wheel relative to the dashboard;
- the control of a multimedia system;
- controls such as centralized door locking, engaging the hazard lights,
- or any other vehicle control known to those skilled in the art.

The input interface 14 may be particularly suitable for autonomous vehicles.

The invention claimed is:

1. Armrest for a vehicle seat, comprising:
   an armrest arm having a substantially horizontal upper support surface forming a support for the forearm of an occupant of the vehicle seat, and
   a user interface having at least one display portion, having a front face comprising a screen and a rear face opposite the front face,
   the user interface being mounted on the armrest arm so as to be movable between a retracted position where the screen is inaccessible and an extended position where the screen is accessible,
   wherein the rear face of the display portion forms a shell and, in the retracted position, the rear face is integrated with the upper support surface of the armrest arm and forms a support region for at least part of the forearm of the occupant of the vehicle seat, and
   in the extended position of the user interface, the screen is at least partially projecting above the upper support surface of the armrest arm.

2. Armrest according to claim 1, wherein the user interface at least partially forms a free end of the armrest.

3. Armrest according to claim 1, wherein the user interface is rotatable relative to the armrest arm.

4. Armrest according to claim 1, wherein the user interface is mounted on a support which is mounted to be movable in translation relative to the armrest arm, in a longitudinal direction of the armrest arm.

5. Armrest according to claim 4, wherein said support is arranged at a free end of the armrest and comprises two support arms extending in the longitudinal direction of the support arm and arranged one on either side of the user interface.

6. Armrest according to claim 1, wherein the upper support surface of the armrest arm has a covering and the shell has the same covering.

7. Armrest according to claim 1, wherein the user interface is mounted to be pivotable about an axis of rotation and further comprises a control portion integral with the display portion, the control portion having a front face and a rear face, the front face of the control portion having an input interface and being arranged to be inaccessible when the user interface is in the retracted position, the armrest arm having a through-opening which accommodates the control portion in the extended position.

8. Armrest according to claim 7, wherein the axis of rotation is arranged at the junction between the screen portion and the control portion.

9. Armrest according to claim 7, wherein the front face of the display portion forms an angle of between 95 and 140 degrees with the front face of the control portion.

10. Armrest according to claim 9, wherein the user interface can be positioned in an indexed intermediate position where the screen is visible to an occupant of the vehicle seat but where the control portion is arranged obliquely in the through-opening of the armrest arm.

11. Armrest according to claim 9, wherein the user interface can be positioned in an indexed partially-open position where the screen is not visible to an occupant of the vehicle seat and where the control portion is arranged obliquely in the through-opening of the armrest arm.

12. Armrest according to claim 7, wherein the input interface is a touch surface.

13. Armrest according to claim 1, wherein the rear face of the display portion is aligned with the upper support face of the armrest arm when the user interface is in the retracted position.

14. Armrest according to claim 1, wherein the shell is integral with the screen and the armrest arm has an opening which accommodates the display portion in the retracted position.

15. Vehicle seat comprising a seating portion, a backrest, and an armrest according to claim 1.

16. Vehicle seat according to claim 15, wherein the armrest arm is distanced from the backrest by a distance of at least 10 cm in the longitudinal direction of the armrest arm.

17. Vehicle seat according to claim 15, wherein the armrest is height-adjustable relative to the seating portion.

* * * * *